United States Patent
Lin

[19]

[11] Patent Number: 6,049,183
[45] Date of Patent: Apr. 11, 2000

[54] BRUSHLESS DIRECT CURRENT FAN

[75] Inventor: Yu Liang Lin, Ban Chiao, Taiwan

[73] Assignee: Asia Vital Components Co., Ltd., Kaohsiung, Taiwan

[21] Appl. No.: 09/116,428

[22] Filed: Jul. 14, 1998

[30]      Foreign Application Priority Data

Jul. 15, 1997 [TW]   Taiwan ................................. 86211831

[51] Int. Cl.⁷ .............................. H02P 7/00; H02K 17/32
[52] U.S. Cl. ........................... 318/434; 318/473; 318/490
[58] Field of Search .................................... 318/138, 139,
318/245, 254, 439, 430–438, 685, 696;
340/635, 641, 648; 417/44.11; 361/20–32,
695, 687; 324/158 MG, 117 H

[56]                  References Cited

U.S. PATENT DOCUMENTS

| | | | |
|---|---|---|---|
| 3,903,430 | 9/1975 | Arns | 307/125 |
| 4,506,218 | 3/1985 | Brown et al. | 324/158 MG |
| 4,644,238 | 2/1987 | Hirosaki | 318/332 |
| 4,992,717 | 2/1991 | Marwin et al. | 318/696 |
| 5,152,477 | 10/1992 | Yeh | 242/186 |
| 5,448,143 | 9/1995 | Pecone | 318/434 |
| 5,554,913 | 9/1996 | Ohsawa | 318/434 |
| 5,604,654 | 2/1997 | Wille et al. | 361/23 |
| 5,726,911 | 3/1998 | Canada et al. | 364/550 |
| 5,727,928 | 3/1998 | Brown | 417/44.11 |
| 5,754,019 | 5/1998 | Walz | 318/434 |
| 5,889,469 | 3/1999 | Mykytiuk et al. | 340/635 |
| 5,898,288 | 4/1999 | Rice et al. | 318/685 |

*Primary Examiner*—Paul Ip

[57]                  ABSTRACT

A brushless direct current fan includes a driving circuit having a Hall device having at least one output terminal connected to the base of a first transistor with the collector of the first transistor connected to a first winding of the fan and also connected to the base of a second transistor via a resistor. The collector of the second transistor is connected to a second winding of the fan. A square wave generation circuit is provided to be coupled to the collector of one of the first and second transistors. The square wave generation circuit is comprised of a current limit resistor and a third transistor wherein the base of the third transistor is connected to the collector of the one of the first and second transistors of the fan via the current limit resistor to obtain an electric signal therefrom which is converted to a square wave signal by the square wave generation and output at the collector of the third transistor. Such a square wave signal may be used to monitor the operation of the fan or may be fed back into the fan driving circuit to control the speed of the fan.

5 Claims, 9 Drawing Sheets

BRUSHLESS DIRECT CURRENT FAN

BACKGROUND OF THE INVENTION

1. Field of the Invention

The present invention is generally related to a brushless direct current (DC) fan and in particular to a brushless DC fan of which the driving circuit comprises a square wave generation circuit for generating a square wave signal indicating the operation of the fan so as to allow ready monitoring of the fan, wherein the driving circuit comprises two transistors alternately conducted on by a Hall device to alternately energize two windings for driving the fan blades to rotate and the square wave generation circuit is coupled to the collector of one of the transistor in order to provide the square wave signal by processing an electrical signal obtained from the collector of the transistor.

2. Description of the Related Art

Direct current (DC) fans have a variety of applications, such as heat dissipation for personal computer. Generally speaking, the DC fan comprises a plurality of permanent magnetic north poles and south poles alternating each other along a circular inner circumference of the fan with a plurality of fan blades 10 fixed to the outer side of the magnetic poles to define a rotor of the fan. A stator of the fan is disposed inside the space surrounded by the magnetic poles, comprising two sets of electromagnets 11 and 12 which are respectively controlled by two sets of windings 13 and 14. One of the electromagnets, for example the electromagnet 11, has a Hall device 15 attached thereon to serve as a sensor and controller. The Hall device 15 controls the rotation of the fan blades 10 via a driving circuit. The DC fan is shown in FIG. 1.

The fan driving circuit, as shown in FIG. 2, comprises two transistors 16 and 17 of which the collectors are respectively connected to the windings 13 and 14. The base of the transistor 16 is connected to an output terminal of the Hall device 15 and the collector of the transistor 16 is also connected to the base of the transistor 17. When the rotor rotates, the Hall device 15 detects for example one of the north poles of the permanent magnet and energizes for example the winding 13 via the transistor 16 which causes the electromagnet 11 to generates the same polarity as the permanent magnet and thus an repulsive force therebetween to drive the rotor for a predetermined angular displacement. With the alternate arrangement of the permanent magnet north and south poles, the angular displacement causes an opposite polarity to be detected by the Hall device 15 which energizes the winding 14 via the transistor 17. This causes the rotor to be further driven and by repeatedly detecting the polarities and driving the rotor via the windings 13 and 14 in an alternate manner, the fan rotates continuously.

In certain cases, such as in a computer application, the DC fan is disposed in a closed space (inside the computer casing) and it is in general difficult, if not impossible, for the computer users to monitor or watch the operation of the fan. Once the fan malfunctions, the heat dissipation of the computer is affected and this may cause significant problem in the operation of the computer central processing unit (CPU). Due to such a situation, monitoring the operation of the DC fan may be needed for certain applications.

One way to monitor the operation of the DC fan is to detect an electrical signal that is generated by the transistors 16 and 17 to energize the windings 13 and 14. A waveform of the electrical signal obtained from the collector of either one of the two transistors 16 and 17 is shown in FIG. 3. Such a waveform is comprised of very irregularly shaped pulses and is an imperfect signal to be used for monitoring the operation of the fan for it is difficult to handle as it is irregular.

To solve such a problem, Taiwan Patent Publication No. 261303 (Application No. 83214410) discloses a brushless DC fan structure which is shown in FIG. 4 for reference. The Taiwanese patent teaches using an external circuit to process the irregular signal. The external circuit is connected to a terminal L1 of the winding of the DC fan, which is designated FAN in FIG. 4 (such as the collector of the transistor 17 in FIG. 1) and comprises a first transistor T1 which is connected to the terminal L1 via a capacitor C1 and a resistor R1. The emitter of the first transistor T1 is grounded via a capacitor C2 and is also connected to the base of a second transistor T2 via a resistor R2 so as to obtain square wave signals from the collectors and emitters of the two transistors T1 and T2. The signals so obtained are applied to an external monitoring circuit to monitor the operation of the fan.

Although such a prior art fan structure allows a user to obtain a desired square wave signal from the fan for monitoring purpose, the signal generation circuit thereof is comprised of a number of additional elements. This is very disadvantageous in view of the limited space that is available inside the DC fan. Thus, the circuit has to be externally mounted to the fan. This increases the overall size of the fan and is contrary to the trend of minimization of the DC fans.

To this point, it is aware that obtaining a square wave signal from the fan in order to monitor the operation of the fan or to feedback to the fan to control the speed thereof is very helpful in controlling the operation of the DC fan and is also a trend in the design of the DC fan. However, currently, the ways of generating the square wave signal from the operation of the fan are not good enough in respect of the size and the practicability.

It is thus desirable to provide an improvement of the brushless DC fan of which a square wave generation circuit that may be built inside the DC fan to provide a desired square waveform to be processed for monitoring and control purpose.

OBJECT AND SUMMARY OF THE INVENTION

An object of the present invention is to provide a brushless DC fan wherein two transistors are used to energize/de-energize two sets of winding for driving the fan and a Hall device is incorporated to alternately conduct on the two transistors for controlling the two windings, characterized in that:

a square wave generation circuit is coupled to the collector of one of the transistors to generate a square wave signal from an electric signal obtained from the windings;

the square wave generation circuit comprising a resistor and a transistor which makes use of the switching characteristics of the transistor to generate the square wave.

BRIEF DESCRIPTION OF THE DRAWINGS

The present invention will be more fully understood by reading the following detailed description of a preferred embodiment thereof, with reference to the accompanying drawings, in which.

DETAILED DESCRIPTION OF THE PREFERRED EMBODIMENTS

Figure 1:
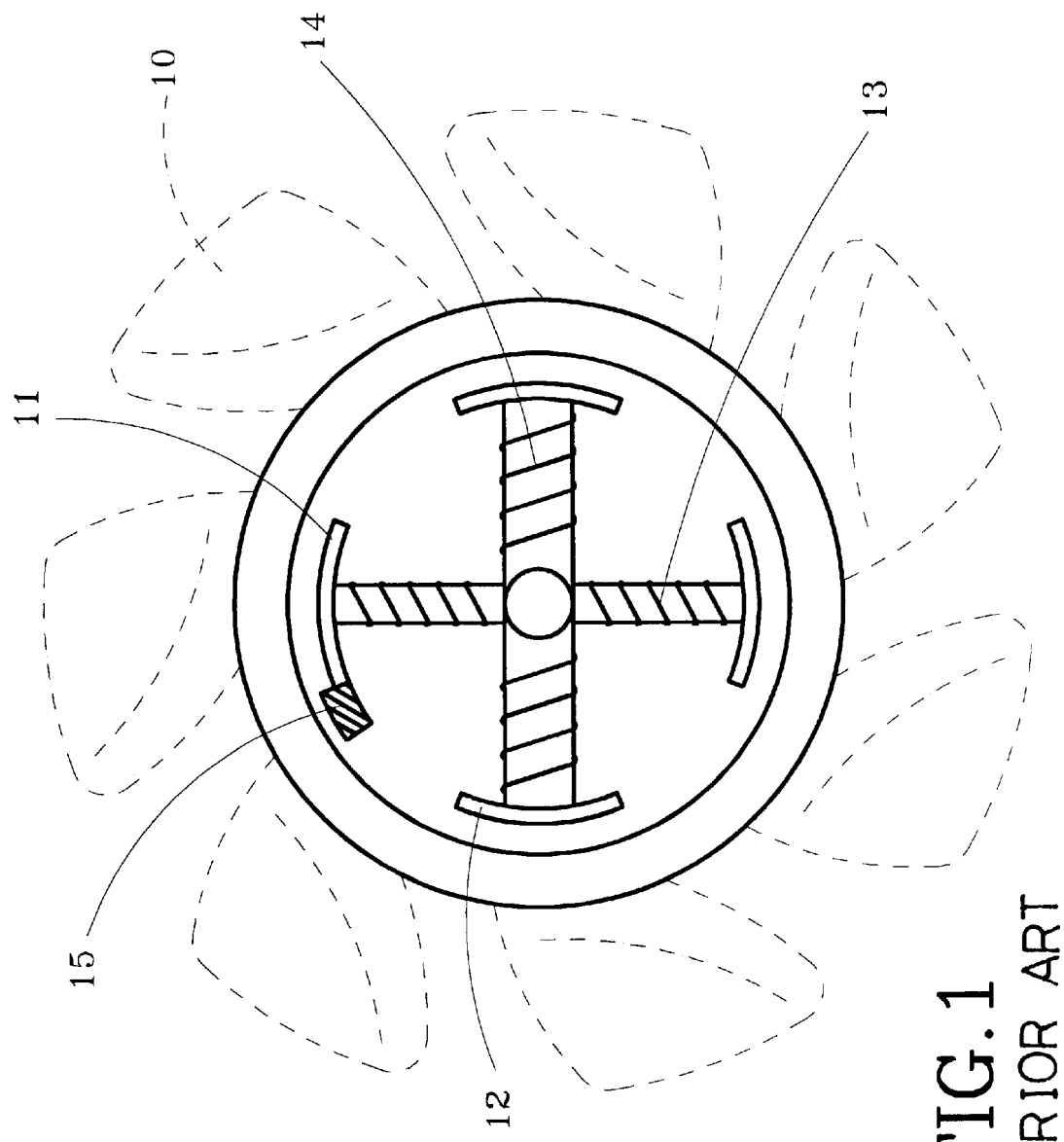
FIG. 1 is schematic view showing the general concept of a brushless DC fan.
Figure 2:
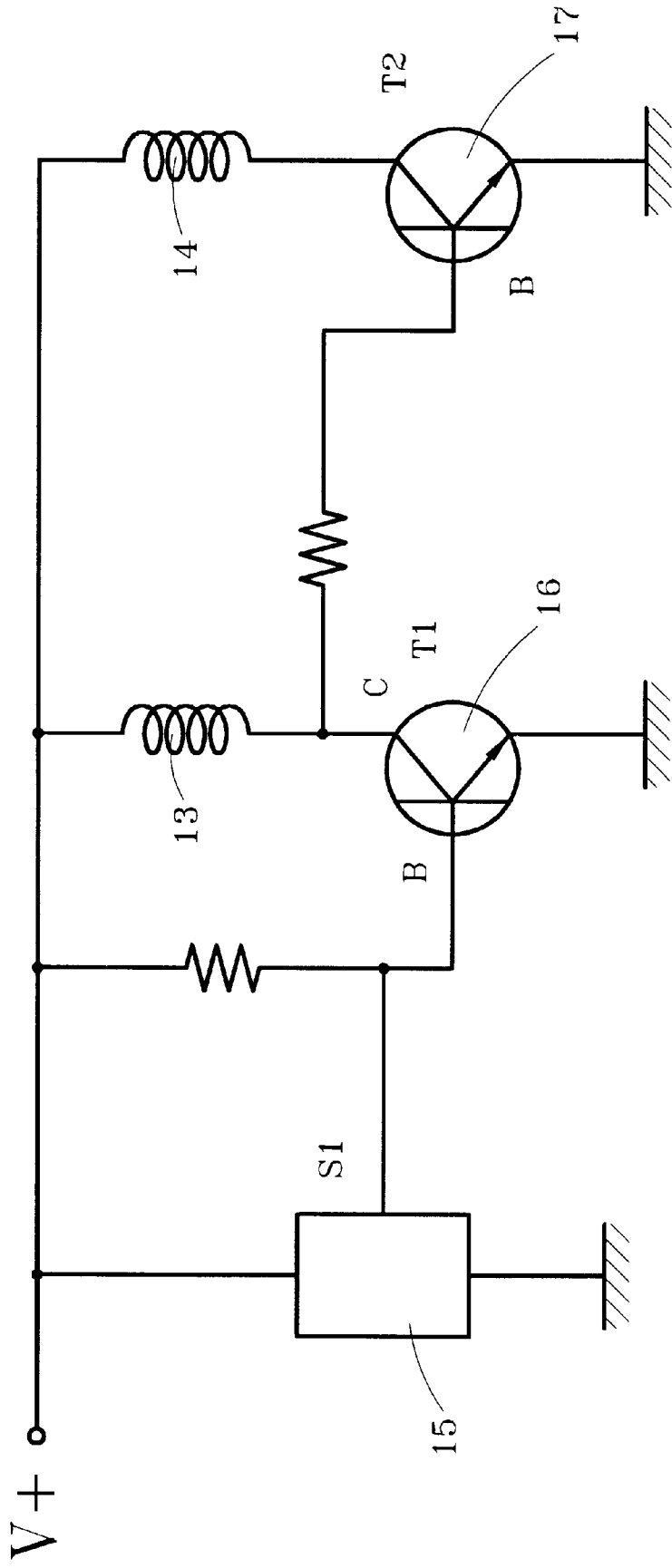
FIG. 2 is a circuit diagram of the conventional brushless DC fan.
Figure 3:
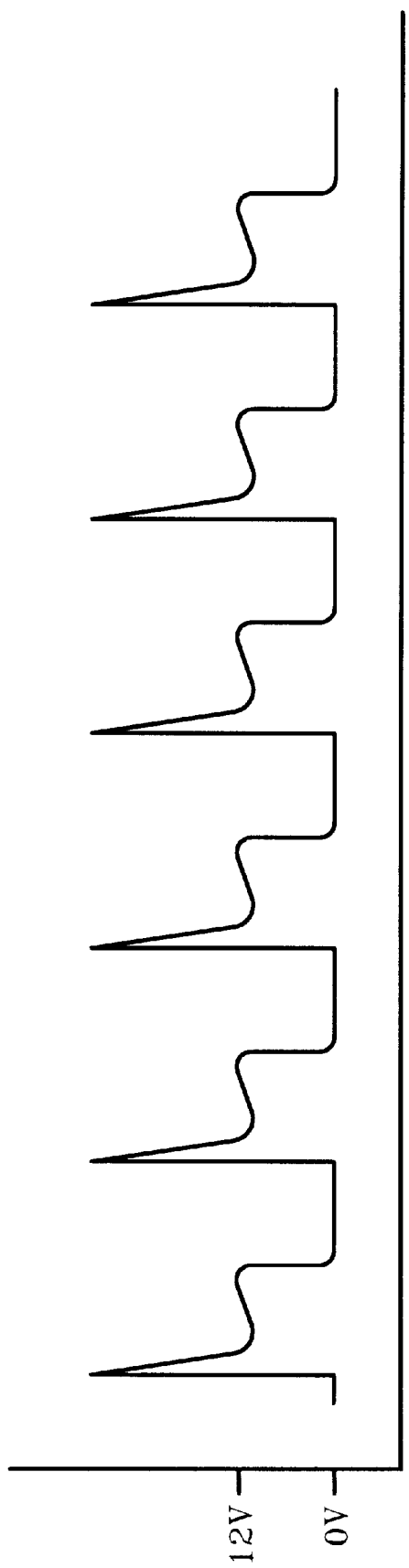
FIG. 3 is a waveform obtained from the conventional brushless DC fan.
Figure 4:
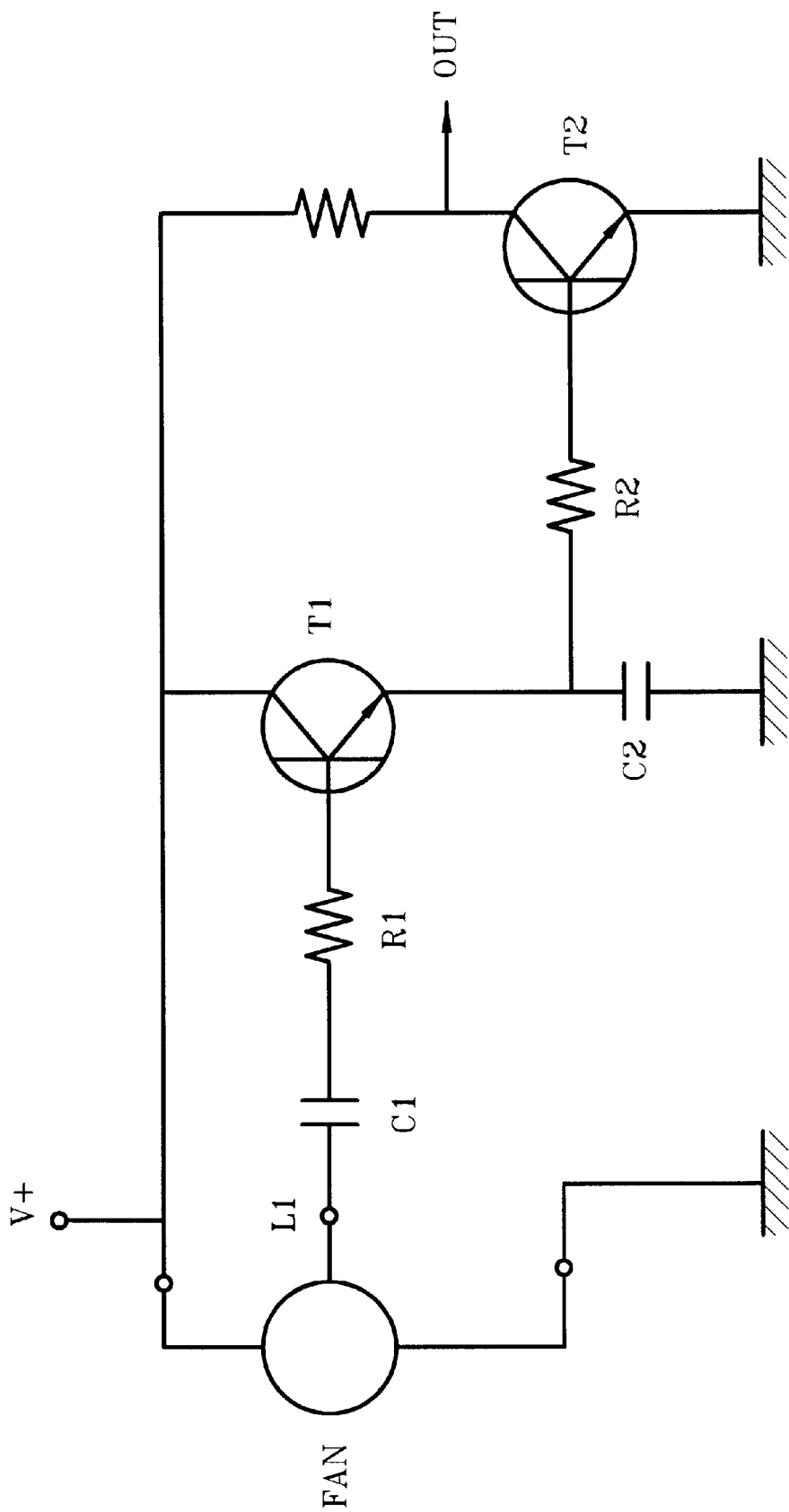
FIG. 4 is a circuit diagram showing a prior art circuit disclosed in Taiwan Patent Application No. 83214410.
Figure 5:
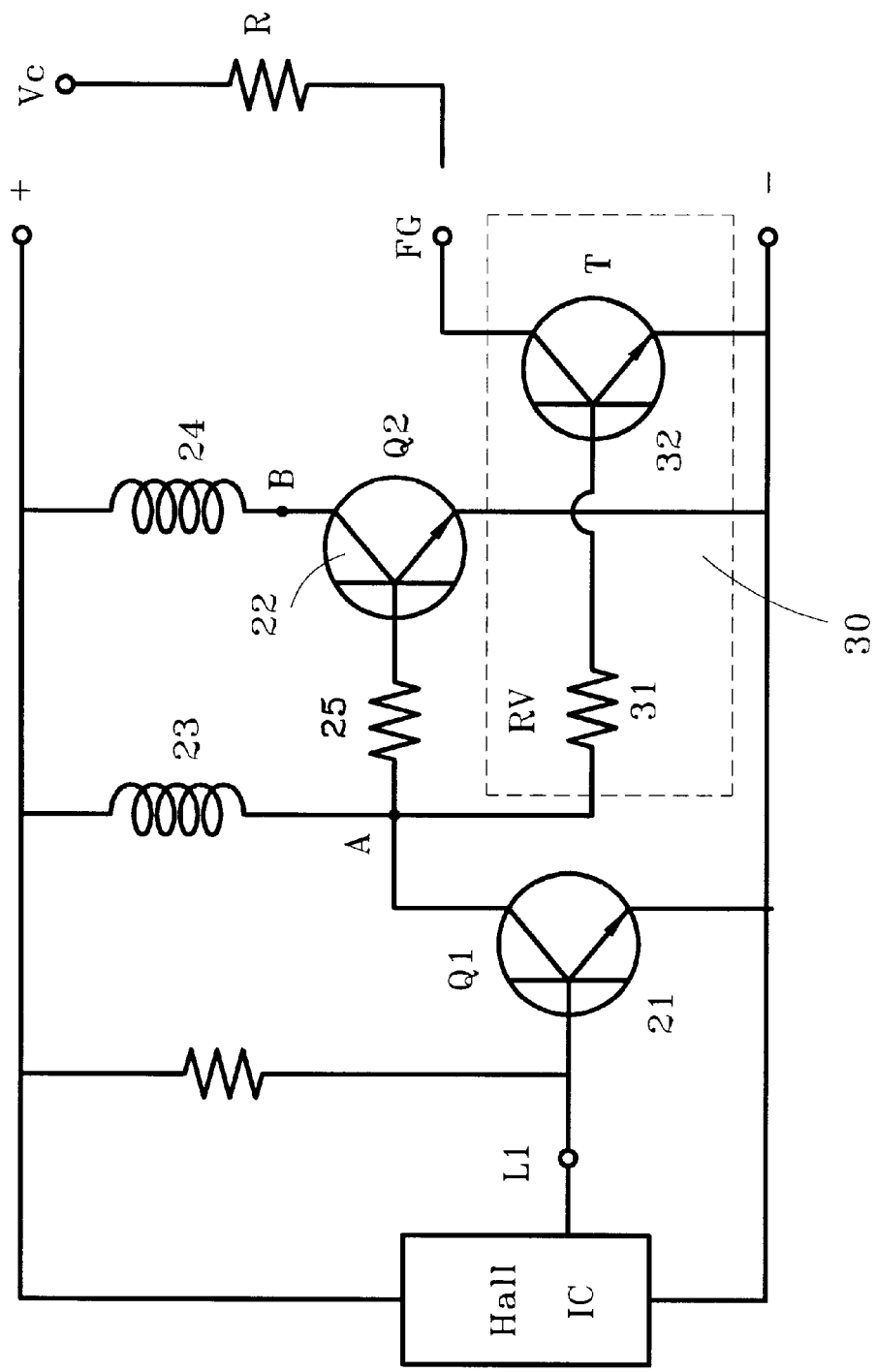
FIG. 5 is circuit diagram of a brushless DC fan in accordance with a first embodiment of the present invention.

With reference to the drawings and in particular to FIG. 5, wherein a circuit diagram of a brushless direct current (DC) fan in accordance with a first embodiment of the present invention is shown, which incorporates a 3 pin Hall device, the Hall device which is generally designated with reference numeral 30, has, besides positive and negative power terminals, an output terminal L1 connected to the base of a first transistor 21. The collector of the first transistor 21 is connected to a first winding 23 of the DC fan and connected to the base 22 of a second transistor 22 via a resistor 25. The collector of the second transistor 22 is connected to a second winding 24 of the DC fan. When the Hall device 20 detects the switching of the two polarities of the permanent magnet, the Hall device 20 generates different voltage levels at the output terminal L1 which alternately energizes the two windings 23 and 24 via the transistors 21 and 22. This is similar to the operation of the conventional DC fans as discussed previously.

The improved feature of the present invention is in that at a connection point A between the first winding 23 and the collector of the first transistor 21, or at a connection point B between the second winding 24 and the collector of the transistor 22, a square wave generation circuit 30 is coupled. In the embodiment illustrated, the square wave generation circuit 30 is coupled to the connection point A between the first winding 23 and the collector of the first transistor 21 to obtain an electrical signal at the connection point A which electrical signal is in general comprised of pulses of irregular shape that will be converted into a desired square wave signal by the square wave generation circuit 30 of the present invention. The square wave so obtained is much easier to process for the purpose of monitoring and controlling than the electrical signal at the connection point A.

Figure 6:
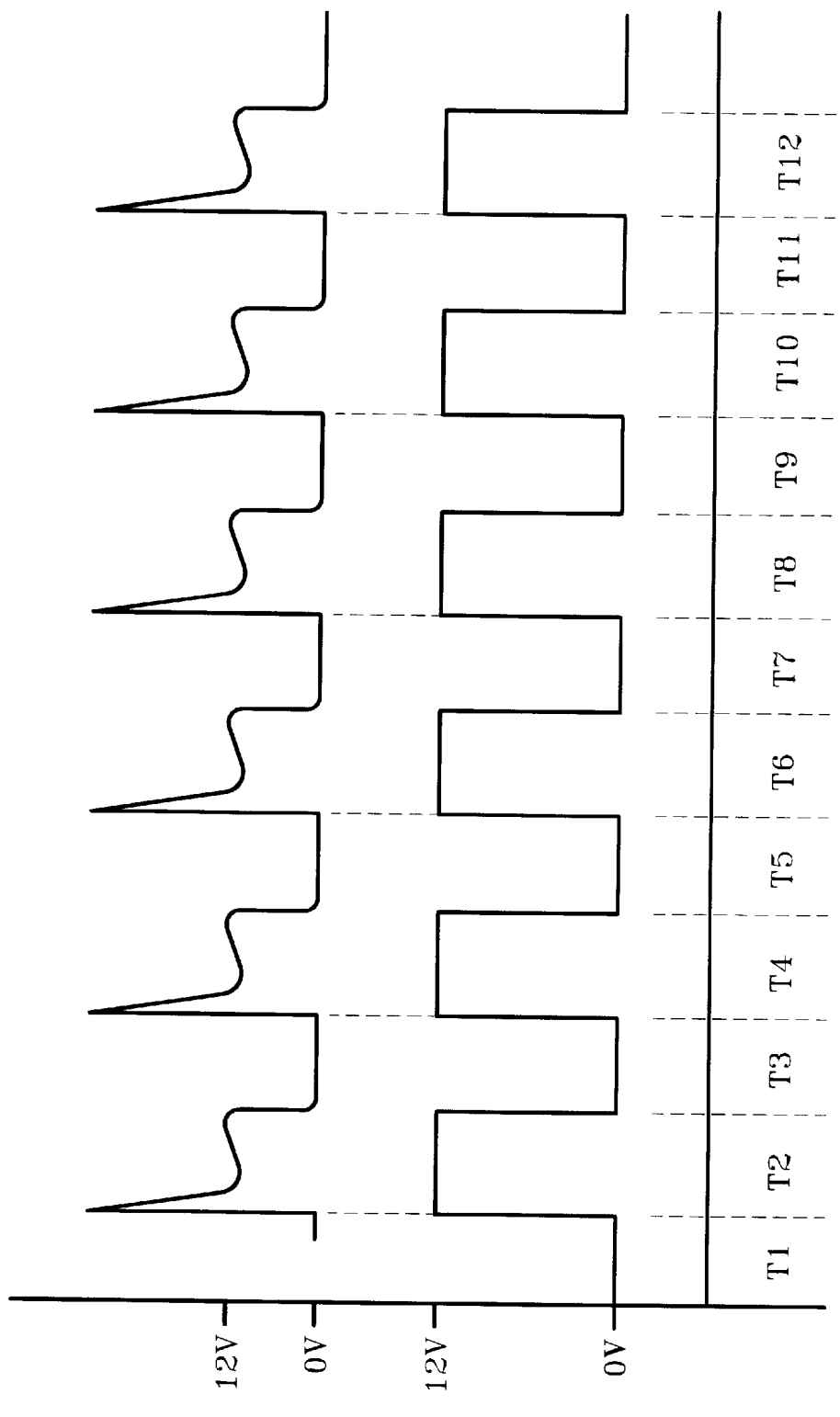
FIG. 6 shows a waveform obtained in the circuit of the present invention.

The square wave generation circuit 30 comprises a current limit resistor 31 and a transistor 32. The base of the transistor 32 is connected to the connection point A via the resistor 31 and the collector of the transistor 32 constitutes a square wave signal output terminal FG. Since a transistor may act like a switch, by being in combination with the resistor 31, the transistor 32 converts the irregularly-shaped pulses of the electrical signal at the connection point A into a desired, regular square wave signal. This is shown in FIG. 6 in which reference label A stands for signal at the connection point A having irregularly-shaped waveform, while reference label FG the output signal at the output terminal of the square wave generation circuit 30 providing regular square waveform.

Figure 9:
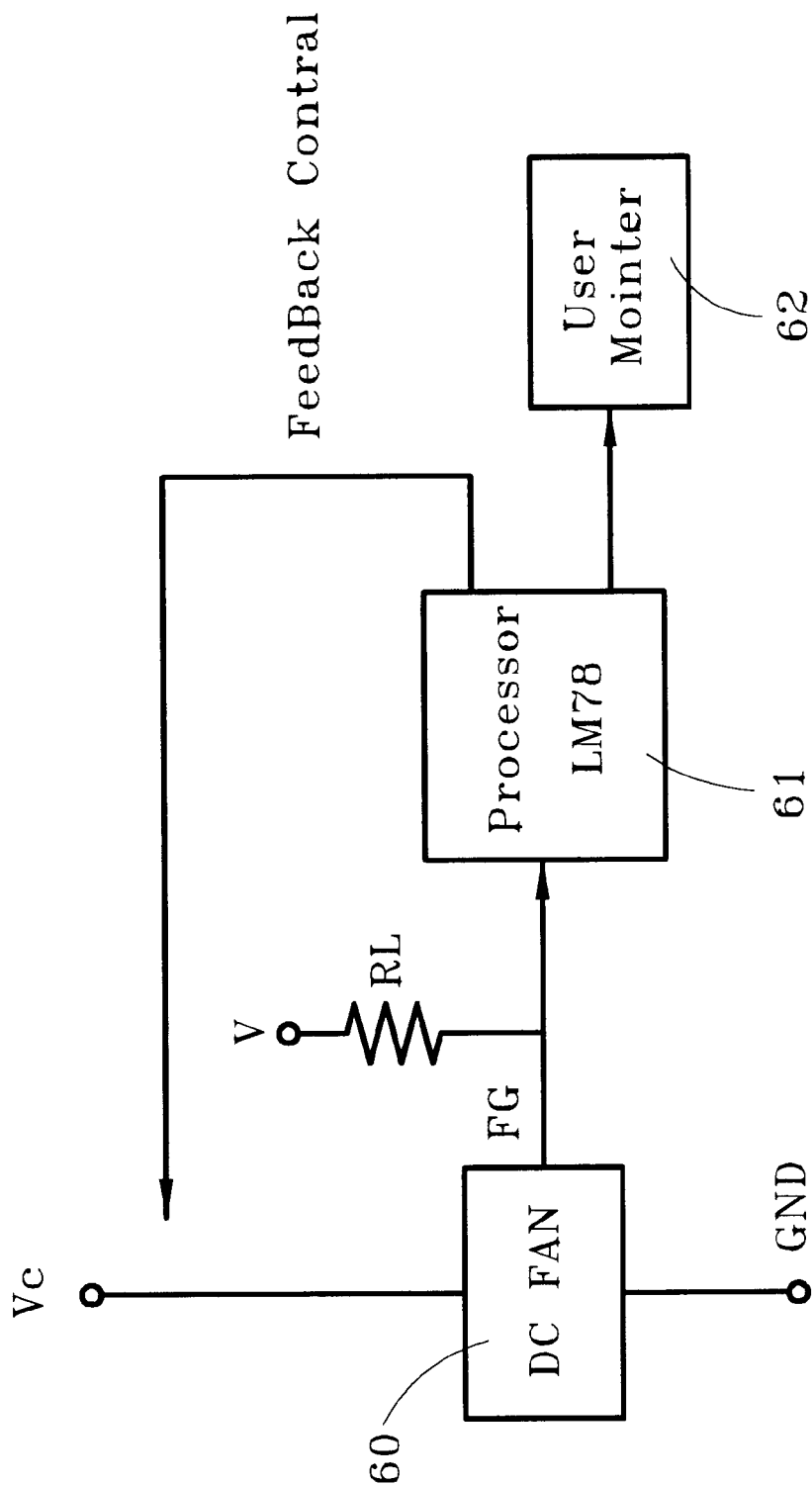
FIG. 9 is schematic circuit diagram showing an application of the present invention in monitoring and controlling the operation of the DC fan.

The square waveform may then be applied to a user monitor via suitable interface means to monitor the operation of the DC fan. Furthermore, by feeding the pulses of the square waveform generated by the square wave generation circuit 30 back to the driving circuit of the DC fan, a control of the rotational speed of the DC fan may be obtained. This may be done by incorporating a feedback circuit in the DC fan circuit, as shown in FIG. 9.

Figure 7:
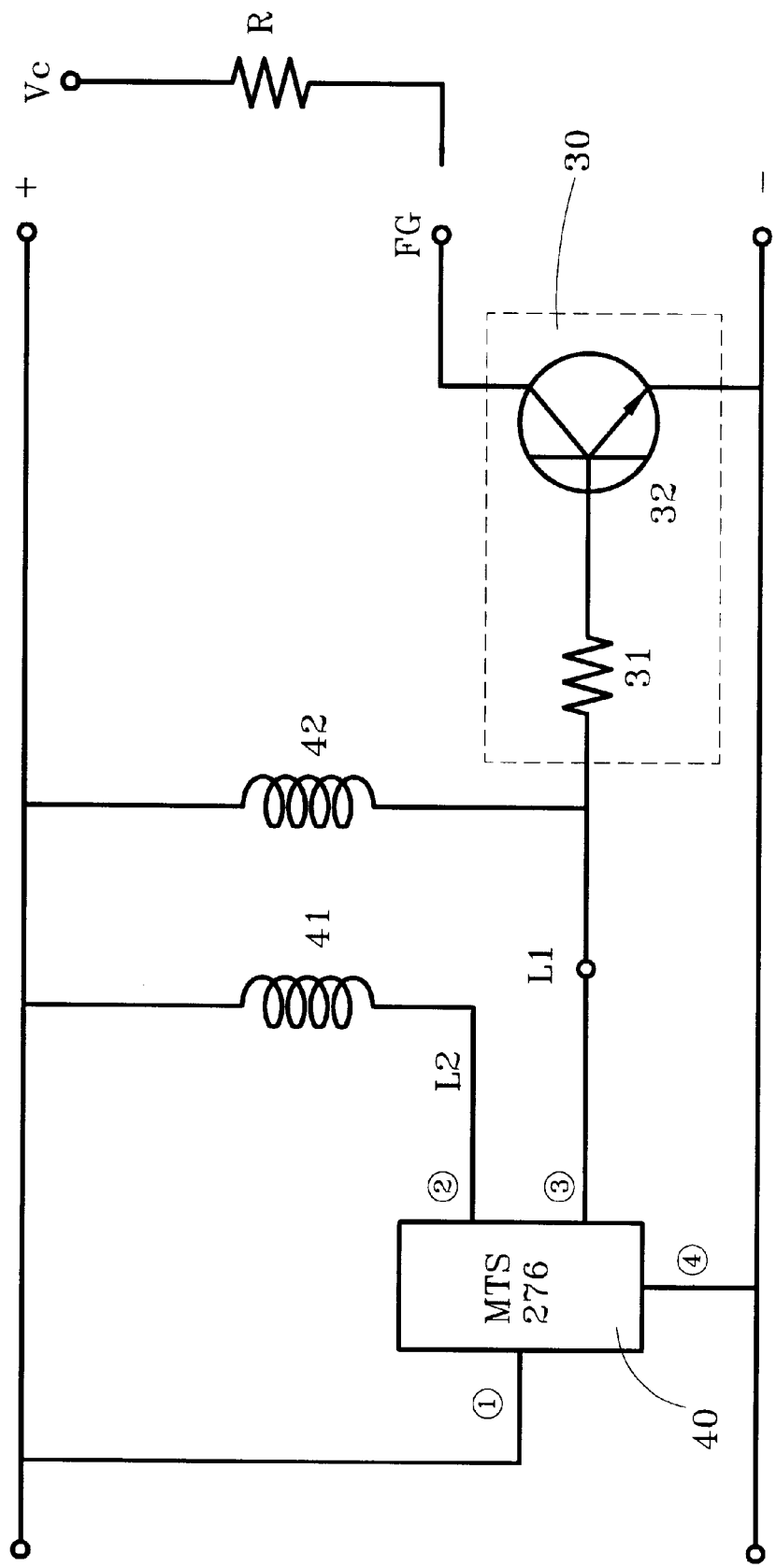
FIG. 7 is circuit diagram of a brushless DC fan in accordance with a second embodiment of the present invention.

In the first embodiment of the present invention discussed with reference to FIG. 5, a 3-pin Hall device is used to control the operation of the fan or the switching between the two windings 23 and 24. Such a 3-pin Hall device may be replaced by a 4-pin Hall device as shown in FIG. 7 which discloses a second embodiment of the present invention. As shown in FIG. 7, the 4-pin Hall device, which is designated at 40, comprises, besides positive and negative power terminals, two output terminals L1 and L2 which are respectively connected to two windings 41 and 42 of the fan circuit for alternately energizing the two windings 41 and 42. Since the 4-pin Hall device 40 comprises a driving circuit incorporated therein, the output signals at the two output terminals L1 and L2 may be directly applied to the windings 41 and 42 to control the energization thereof and no additional driving circuit is needed. An example of the 4-pin Hall device 40 may be comprised of IC code MTS276.

In accordance with the present invention, in the above second embodiment DC fan that comprises a 4-pin Hall device 40, a square wave generation circuit 30 is coupled to one of the output terminals of the Hall device 40, for example the output terminal L1, so that when the Hall device 40 drives the associated winding 41, an electrical signal that is used to drive the winding 41 is applied to the square wave generation circuit 30 and a square wave signal is generated at output terminal FG of the square wave generation circuit 30 by processing the electrical signal by the square wave generation circuit 30.

Figure 8:
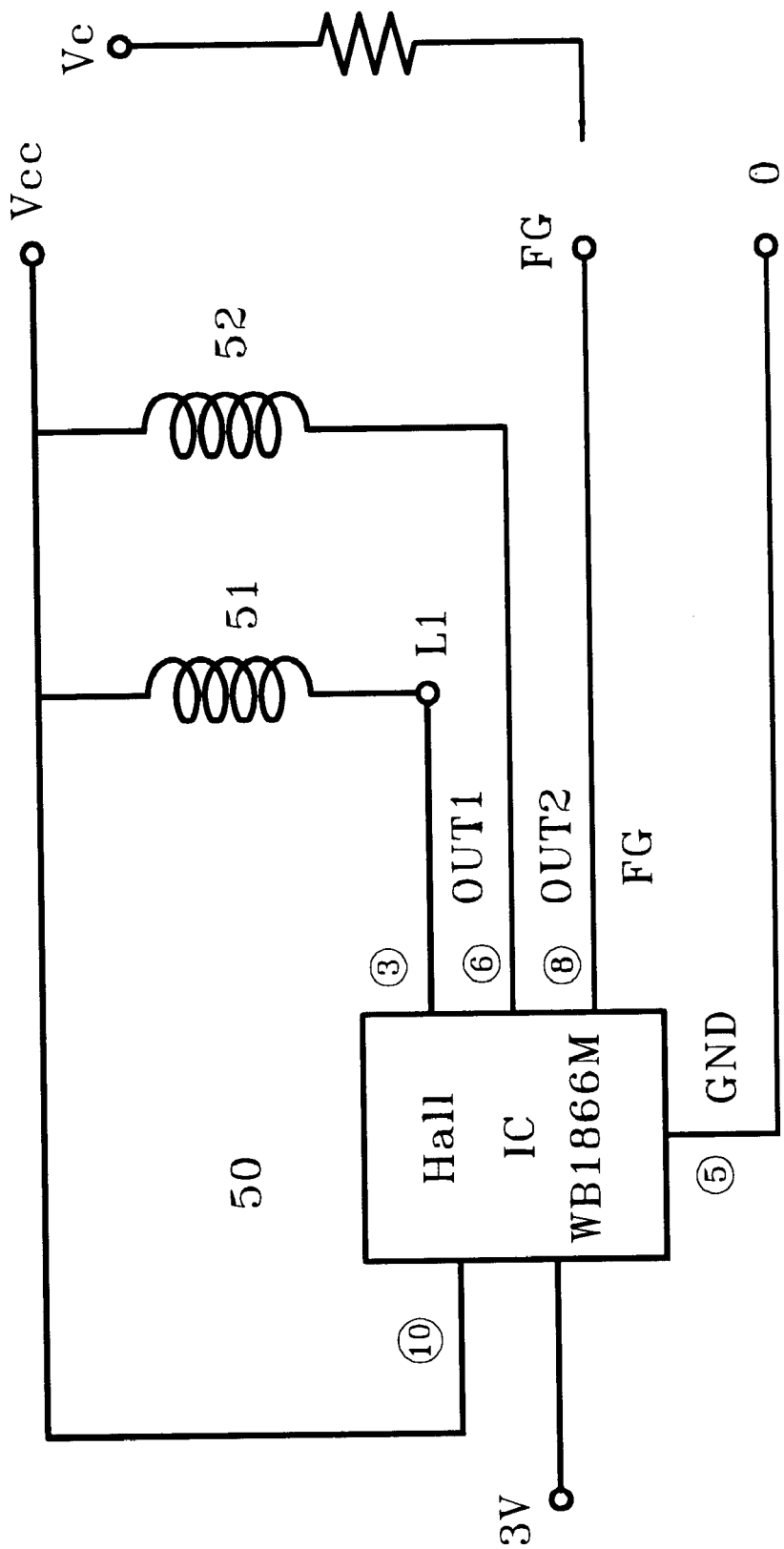
FIG. 8 is circuit diagram of a brushless DC fan in accordance with a third embodiment of the present invention.

As discussed above, the size of the DC fan is a major concern in designing the DC fan. Due to the trend and requirement of the minimization of the DC fan, in accordance with the present invention, the square wave generation circuit may be integrated with the Hall device by means of integrated circuit technique to further reduce the space that is needed by the square wave generation circuit inside the DC fan. As shown in FIG. 8 which illustrates a third embodiment of the present invention in which a circuit incorporating a square wave generation circuit integrated in a Hall device is shown, a Hall device 50 comprises, besides the two output terminals L1 and L2 which are respectively connected to two windings 51 and 52, similar to that shown in FIG. 7, a square wave signal output terminal FG for supply of a square wave signal for monitoring and control purposes.

As shown in FIG. 9, wherein an application of the present invention in monitoring the operation of a DC fan is demonstrated, the output terminal FG of the square wave generation circuit 30 incorporated in a DC fan 60 is connected to a microprocessor 61 which may be for example IC code LM78, having a first output coupled to a user monitor 62 and a second output connected to a power supply Vc of the DC fan 60 to provide a feedback control loop so that the fan 60 generates and sends the square wave signal to the microprocessor 61 to be processed thereby. The processed signal is applied to the user monitor for showing the operation condition of the fan 60. The processed signal is also transmitted to the power supply Vc to control the rotational speed of the fan 60.

From the above description, it may be summarized that the brushless DC fan of the present invention has an advantage that it incorporates a square wave generation circuit into the original driving circuit of the fan. Since the square wave generation circuit has a simple circuit structure that may be integrated with the original circuit board of the fan, no additional device or elements are needed and thus no expansion of the size of the DC fan is required.

Further, the brushless DC fan of the present invention, as compared with the conventional ones, is significantly simplified in structure and thus the number of parts may be reduced and cost lowered down.

It is apparent that although the present invention is illustrated with the description of the preferred embodiments thereof, it is contemplated that there may be changes and modifications in the described embodiments that can be carried out without departing from the scope of the invention which is intended to be limited only by the appended claims.

What is claimed is:

1. A brushless direct current fan comprising:
    a) a first winding;
    b) a second winding;
    c) a first transistor including a base and including a collector connected to said first winding;
    d) a Hall device including an output terminal connected to said base of said first transistor;
    e) a second transistor including a base and including a collector connected to said second winding;
    f) a first resistor connected between said collector of said first transistor and said base of said second transistor; and
    g) a square wave generation circuit including:
        i) a third transistor including a collector and a base; and
        ii) a current limit resistor connected between said base of said third transistor and said collector of said first transistor for receiving a signal from said collector of said first transistor;
    said square wave generation circuit being provided for converting the signal from said collector of said first transistor into a square wave signal.

2. The brushless direct current fan as claimed in claim 1, wherein said first resistor is connected to said first winding and said collector of said first transistor at a connection point, and said current limit resistor is connected to said collector of said first transistor at said connection point.

3. The brushless direct current fan as claimed in claim 1, wherein said Hall device is a 3-pin device.

4. The brushless direct current fan as claimed in claim 1, wherein said Hall device is a 4-pin device.

5. The brushless direct current fan as claimed in claim 4, wherein said Hall device includes two output terminals connected to said first and said second windings respectively and includes an output terminal connected to said square wave generation circuit.

* * * * *